United States Patent [19]
Grieg

[11] Patent Number: 5,524,731
[45] Date of Patent: Jun. 11, 1996

[54] UNIVERSALLY MOUNTABLE BRAKE ASSEMBLY FOR A HAND TRUCK

[75] Inventor: James J. Grieg, 1115 N. Signal St., Ojai, Calif. 93023

[73] Assignees: John R. Grieg, Oakview; David M. Grieg; James J. Grieg, both of Ojai, all of Calif.

[21] Appl. No.: 391,714

[22] Filed: Feb. 21, 1995

[51] Int. Cl.⁶ ........................................................ B60T 1/04
[52] U.S. Cl. ........................ 188/19; 188/22; 188/29; 188/2 D; 280/47.28; 280/47.27; 280/47.131
[58] Field of Search ................................ 188/19, 21, 22, 188/29, 2 D, 196 M, 196 V; 280/33.994, 47.28, 47.27, 47.17, 47.131, 47:23, 47.34

[56] References Cited

U.S. PATENT DOCUMENTS

| | | | |
|---|---|---|---|
| 2,738,034 | 3/1956 | Levine | 188/29 |
| 2,905,482 | 9/1959 | Ruttger | 188/22 X |
| 3,276,550 | 10/1966 | Honeyman | 188/29 |
| 3,422,930 | 1/1969 | Barron | 188/19 X |
| 4,819,767 | 4/1989 | Laird | 188/2 D |

Primary Examiner—Josie Ballato
Attorney, Agent, or Firm—Gene W. Arant

[57] ABSTRACT

A brake assembly is universally mountable to any one of several different types and sizes of hand trucks. The complete brake assembly includes a brake control handle that is removably attached to the upper frame of the hand truck; a brake bar assembly having a base removably attached to the axle of the hand truck, and a horizontally extending brake bar with brake pads on its two ends adapted to engage the wheels; a cam mechanism for depressing the brake bar; and a cable coupling the brake control handle to the cam mechanism.

13 Claims, 5 Drawing Sheets

5,524,731

UNIVERSALLY MOUNTABLE BRAKE ASSEMBLY FOR A HAND TRUCK

FIELD OF THE INVENTION

The present invention relates to a brake assembly for use on hand trucks, and more particularly, to a brake assembly that is universally mountable to any one of several different types and sizes of hand trucks.

PRIOR ART

Prior art patents include the following:

| No. | U.S. Pat. No. | Issue Date | Name |
| --- | --- | --- | --- |
| 1. | 2,546,876 | March 27, 1951 | J. H. Sutherland |
| 2. | 2,800,336 | July 23, 1957 | S. L. Major, et al. |
| 3. | 2,980,200 | April 18, 1961 | W. A. Kibby |
| 4. | 3,035,727 | May 22, 1962 | F. R. Turner |
| 5. | 3,276,550 | October 4, 1966 | A. A. Honeyman |
| 6. | 3,422,930 | January 21, 1969 | W. S. Barron |
| 7. | 3,950,005 | April 13, 1976 | W. C. Patterson |
| 8. | 3,968,974 | July 13, 1976 | N. Wetzel |

Others:
Belgium Patent No. 646,882, 22 Avril, 1964, Mr. August Manss
U.K. Patent (The Patent Office, London) No. 593,830, Accepted Oct. 27, 1947, Jack Turner.

So far as presently known to this inventor the prior art has provided a hand-operated brake for a hand truck only as an integral part of the hand truck itself.

SUMMARY OF THE INVENTION

According to the present invention a brake assembly is provided that is universally mountable to any one of several different types and sizes of hand trucks. The complete brake assembly includes a brake control handle that is removably attached to the upper frame of the hand truck; a brake bar assembly having a base removably attached to the axle of the hand truck and a brake bar with associated brake pads adapted to engage the wheels; a cam mechanism for depressing the brake bar; and a cable coupling the brake control handle to the cam mechanism.

DRAWING SUMMARY

DESCRIPTION OF THE PREFERRED EMBODIMENT

(FIGS. 1–11)

The presently preferred embodiment of the invention includes a hand operated braking system that can be removably mounted upon almost any type of delivery hand truck that is conventionally used with commercial truck/trailer rigs.

Figures 1, 2:
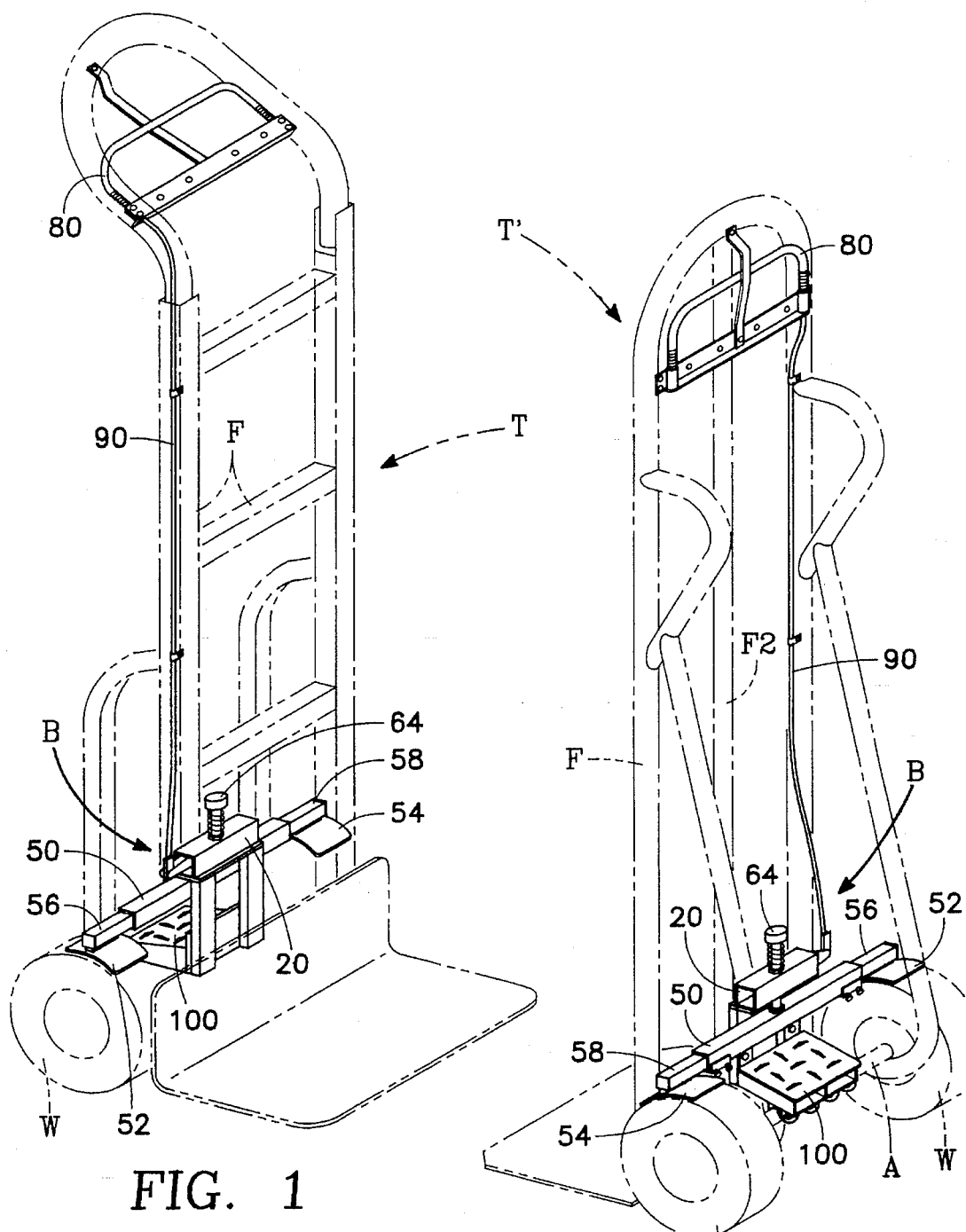
FIG. 1 is a perspective view of a typical aluminum hand truck on which my novel retrofit brake assembly has been mounted.
FIG. 2 is a perspective view of a typical steel hand truck on which my novel retrofit brake assembly has been mounted.

Referring now to the drawings, FIGS. 1 and 2 show conventional hand trucks of the type that includes a vertically extending frame having a lower end supported by an axle on a pair of wheels, and a hand grippable upper frame portion. FIG. 1 shows a steel hand truck from the front side. In FIG. 1 the hand truck is identified by letter T, its frame by letter F, the axle by letter A, and the wheels by letter W. In FIG. 2 the same designations are used, except that the hand truck is an aluminum truck shown from the back side. The hand truck, being of a different design, is identified as T'. In each figure the brake assembly B provided in accordance with the present invention is removably attached as an accessory to the hand truck.

Figure 4:
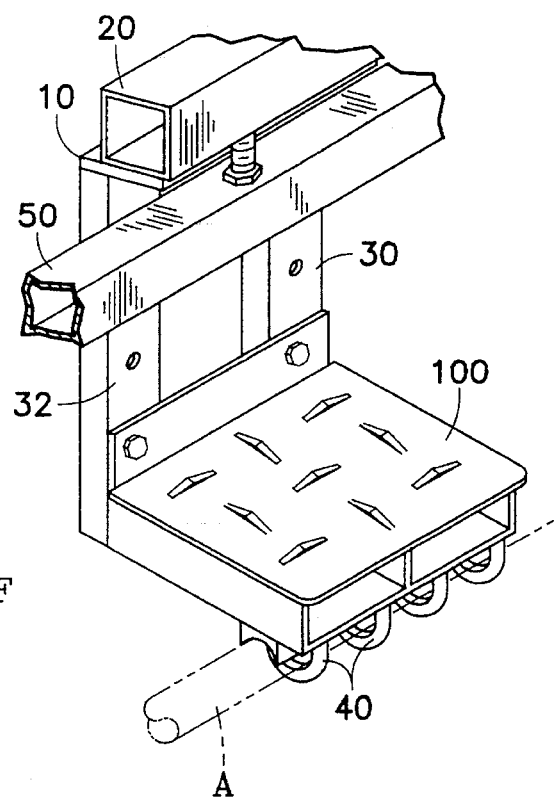
FIG. 4 is an exploded fragmentary perspective view showing the base of my novel brake assembly attached to the axle of a hand truck, and its adjustability for wheel size.
Figure 6:
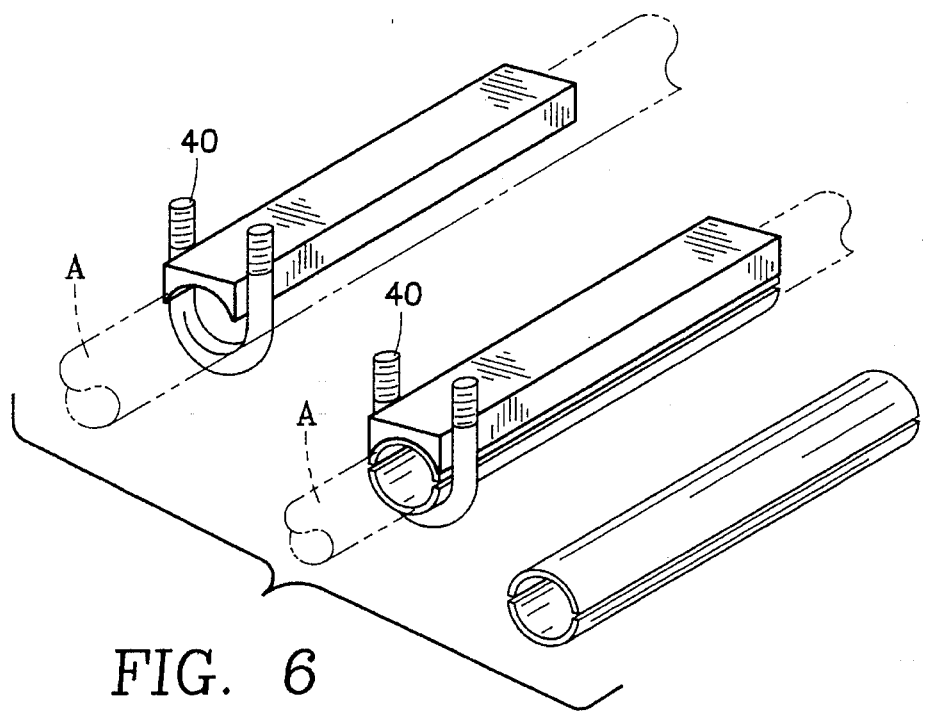
FIG. 6 is a fragmentary perspective view of various adapters that may be used for different size axles.
Figure 7:
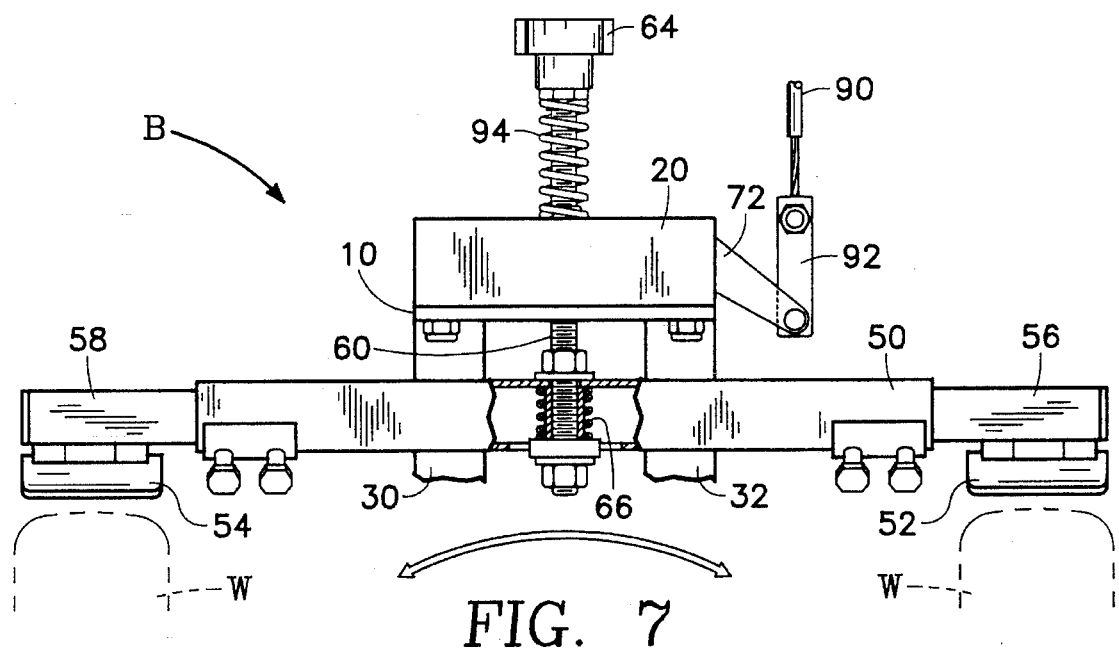
FIG. 7 is an elevation view of my floating brake bar, with a schematic showing of a spring assembly that provides the floating action.
Figure 8:
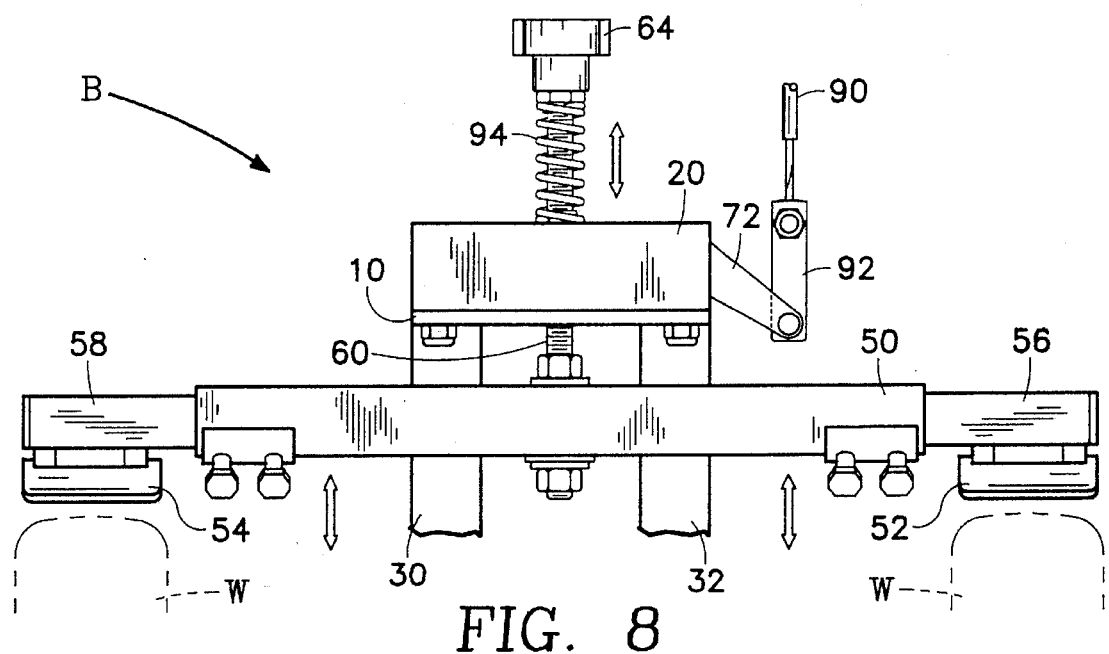
FIG. 8 is an elevation view of the brake bar, plunger assembly, and control knob, illustrating adjustability of the control knob to adjust the clearance of the brake pads from the wheels of the hand truck.

The brake assembly B itself includes a base 10, best shown in FIG. 6, which is attached to the axle A, and a square tube 20 horizontally positioned above the base and in parallel relation to it. Tube 20 is best seen in cross-section in FIGS. 10 and 11. Two vertically extending posts 30, 32, see FIG. 4, are connected between the base 10 and the square tube 20 so as to support the square tube at a fixed elevation above the axle A.

Also included in the brake assembly B is a means for inhibiting rotatable movement of the base, the square tube, and the posts relative to the axle A. In FIG. 1 the inhibiting means includes U bolts 40, FIG. 4, FIG. 6. In FIG. 2 the square tube 20 is also attached directly to a central frame member F2.

A brake bar 50 is horizontally disposed between the base 10 and square tube 20 in generally parallel relationship thereto. Curved brake pads 52, 54, are hingedly supported from respective extensible ends 56, 58, of the brake bar 50. As best seen in FIGS. 7 through 11, a guide rod 60 has its lower end secured to the brake bar 50 and extends vertically upward in vertically movable relation to the square tube 20, the vertical movement being best illustrated by arrows in FIGS. 9, 10, and 11.

Figure 9:
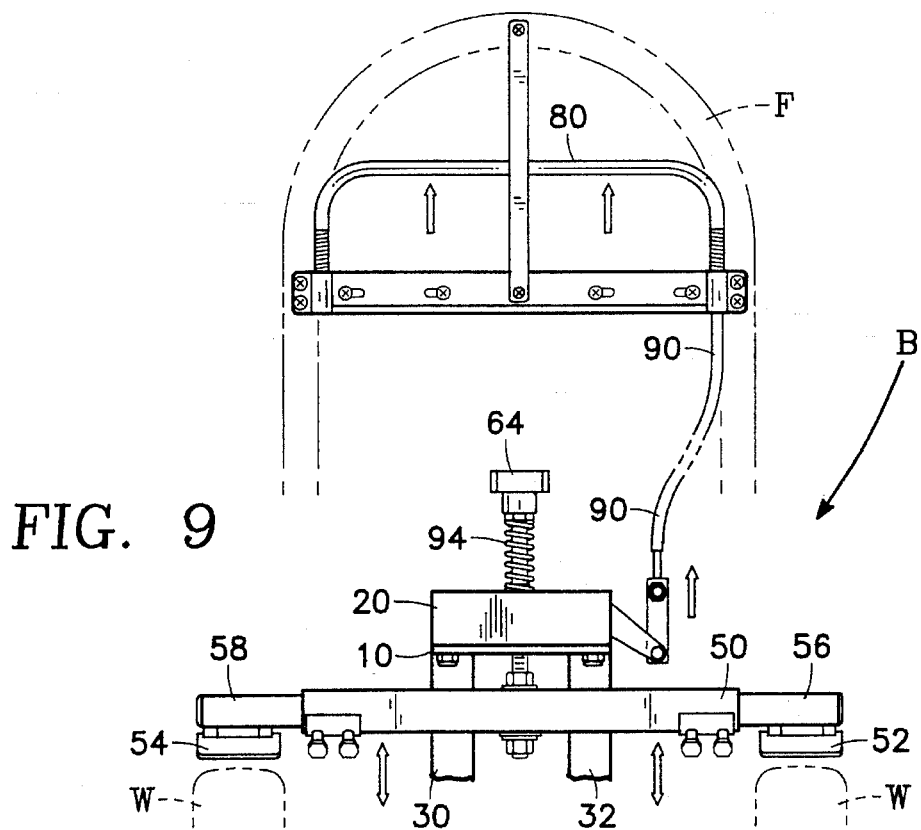
FIG. 9 is an elevation view, partially in a schematic form, showing how the braking action initiated by the control handle is applied through the cable to the cam mechanism, brake bar, brake pads, and wheels.
Figure 10:
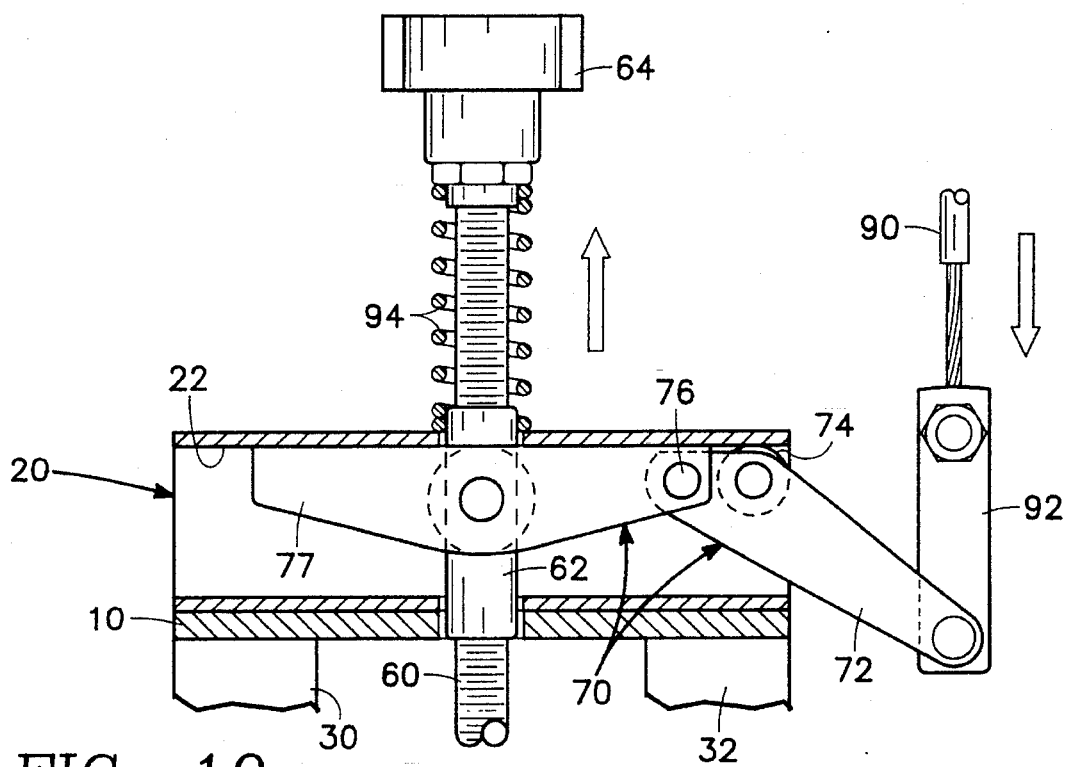
FIG. 10 is an elevation view, partially in schematic form and partially in cross-section, showing the cam mechanism for actuating the brake bar.
Figure 11:
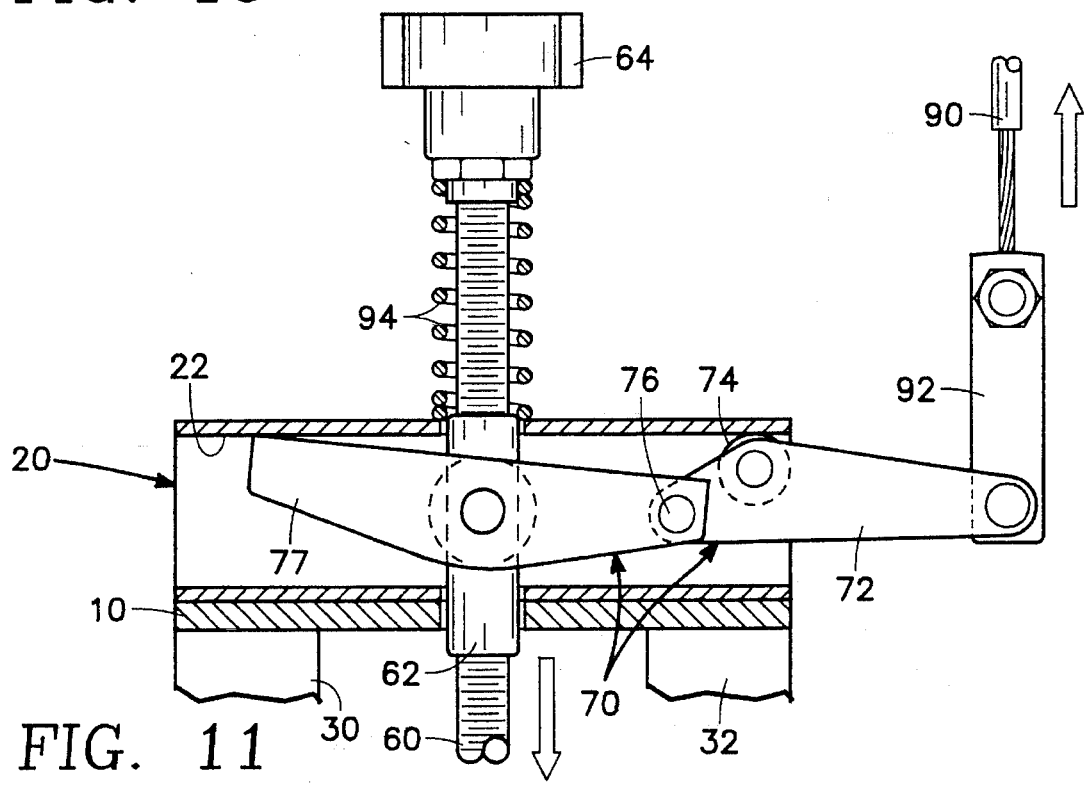
FIG. 11 is a view like FIG. 10, but showing the position of the cam mechanism after the plunger has been depressed.

As best seen in FIGS. 10 and 11, the square tube 20 has an upper plate 22 whose lower surface acts as a cam plate. A cam mechanism 70 is associated with the under side of the cam plate and is coupled to the guide rod 60 for depressing the brake bar. A brake control handle 80 is removably attached to the hand grippable upper frame portion of the hand truck, as shown in FIG. 9, and a cable 90 couples the brake control handle 80 to the cam mechanism 70. When the cable is pulled upward, the cam mechanism forces the guide rod 60 and brake bar 50 in a downward direction, thus engaging brake shoes 52, 54, with the wheels W.

As best seen in FIGS. 10 and 11, the lower end of cable 90 is attached to a rigid member 92, whose lower end is pivotally coupled to a cam lever 72. Cam lever 72 extends in a horizontal direction, and its other end has a roller 74 on its upper edge, while its lower edge corner is pivotally coupled at 76 to a plunger lever 77. The mid-portion of plunger lever 77 is pivotally coupled to a plunger 62, which is a threaded collar secured to guide rod 60.

The apparatus of the present invention will provide the operator with increased safety and confidence while handling heavily loaded hand trucks going down declines such as truck and trailer ramps, stairs, or driveway slopes, whether moving at a safe controlled speed or coming to a complete stop. This braking ability offers the operator less physical strain and fatigue, fewer back injuries, less lost work time, and helps prevent hand truck runaway which can result in product damage and personal injury.

The unique design features enable the device to easily retrofit to typical "top loop" handle design hand trucks used for product delivery in the food service, beverage and general merchandise industry operating down truck and trailer ramps. The varied mounting design capability also provides for long service life in allowing the braking device to be transferred from one hand truck to another.

Pulling up the control handle 80 with either or both hands raises the control cable 90 which is linked to the cam/plunger assembly 62, 70. Raising the cam pushes the spring loaded plunger 62 downward applying downward pressure to the brake bar 50/brake pad 52, 54, assembly which makes braking contact with the hand truck tires. Depending on the amount of lifting pressure applied to the control handle, varying braking pressure is applied to control the handtruck speed or to achieve a complete stop. Fully releasing the control handle releases all braking contact with the handtruck tires, because of the return spring 94. Return spring 94 rests on top of square tube 20 and applies upward pressure to the under surface of a knob 64 on the upper end of guide rod 60.

Figure 3:
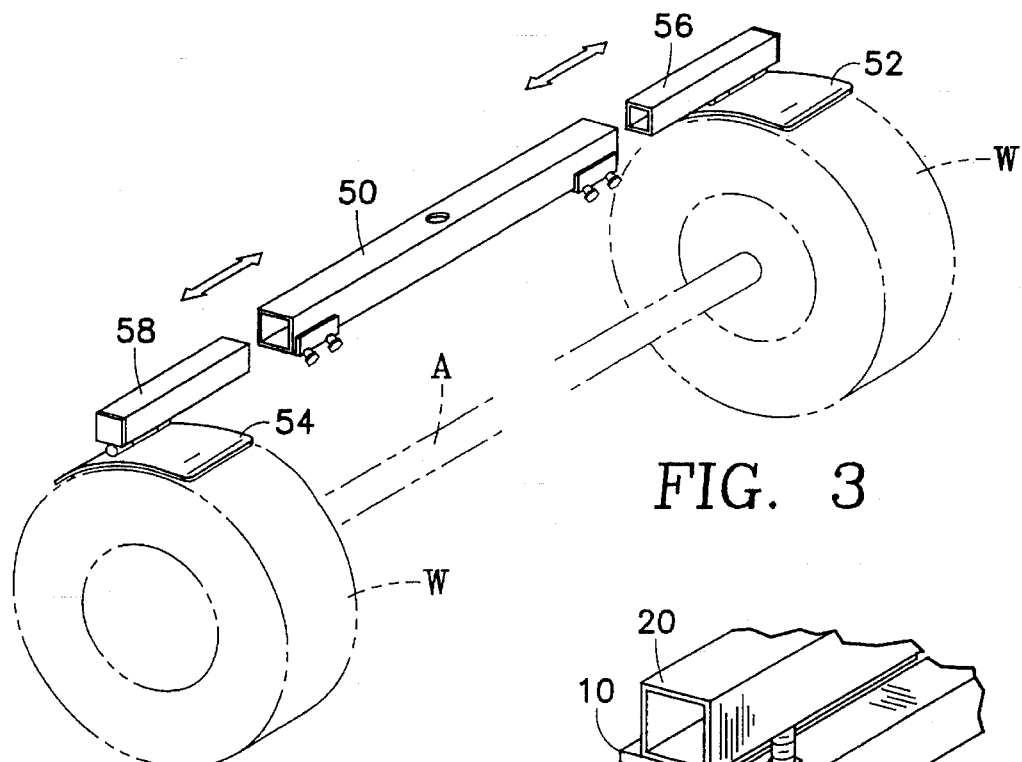
FIG. 3 is an exploded fragmentary perspective view showing how the extendable brake pads of my invention are applied to the wheels of a hand truck.

The many special features of the invention include the following:

Extendible brake pad design allows fitting the device to handtrucks with wheelbase widths from 14½ to 21 inches as well as others. See drawing FIG. 3.

Varied axle mounting bracket hole locations allow the device to fit handtruck wheel diameters of 8 and 10 inches. Fitting to other wheel diameters can be made. See drawing FIG. 4.

Figure 5:
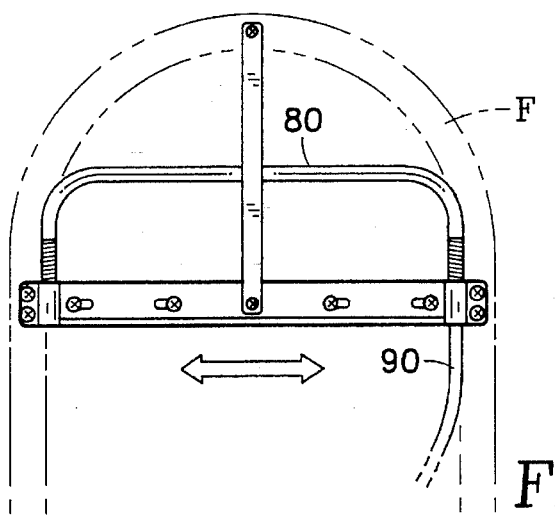
FIG. 5 is an elevation view of the upper end portion of a hand truck showing the location of the brake control handle of my novel retrofit brake assembly.

Extendible brake control handle bracket allows the brake control handle to fit handtruck frame widths from 10½ to 14 inches as well as others. See drawing FIG. 5.

Axle adapter design allows bolting the device to handtruck axles of ⅝ and ¾ inch diameter. Other axle diameters can be fitted. See drawing FIG. 6.

A spring loaded brake bar allows braking equalization to both wheels simultaneously, preventing unequal braking pressure causing the handtruck to dangerously pull to one side or the other. See spring 66 in drawing FIG. 6.

A single control knob 64 provides for the proper brake pad to tire contact clearance as well as providing adjustment for tire wear. See drawing FIG. 8.

A brake activation hand control allows the use of one or both hands at the top loop of the handtruck for unrestricted operator braking control. See the upper part of drawing FIG. 9. This upper brake handle positioning provides an easy brake activation control which allows the operator convenient use of one or both hands but without restricting support of the handtruck load.

A cam activated plunger provides compounded brake pressure when the brake control handle is operated. This varied pressure is applied to the brake bar forcing the brake pads down to make braking contact with the tires. Degrees of releasing the control handle reduces or releases all braking contact with the tires. See drawing FIG. 10.

Curved and hinged brake pads are contoured to make maximum braking area contact to 8 and 10 inch diameter wheels, or other sizes as desired. See drawing FIG. 3.

Another feature of my invention is the step plate 100 that is attached above the base 10 and secured to posts 20, 30. By using one foot on this step plate the operator is able to more precisely control the action of the hand truck, when tilting back to lift the load.

The presently preferred form of the invention has been disclosed in considerable detail in order to comply with the requirements of the patent laws. The breadth and scope of the invention, however, are to be judged only in accordance with the appended claims.

What I claim is:

1. A brake assembly removably attachable as an accessory to a hand truck of the type that includes a vertically extending frame having a lower end supported by an axle on a pair of wheels, and a hand grippable upper frame portion, said brake assembly comprising:

(a) a base adapted to be removably attached to the axle;
   (b) a cam plate adapted to be horizontally positioned above said base in parallel relation thereto;
   (c) at least one vertically extending post connected between said base and said cam plate so as to support said cam plate at a fixed elevation above the axle;
   (d) means for inhibiting rotatable movement of said base, said cam plate, and said at least one post relative to the axle;
   (e) a brake bar horizontally disposed between said base and said cam plate in generally parallel relationship thereto, and having brake pads supported from its respective ends;
   (f) a vertically extending guide rod having its lower end secured to said brake bar and extending upward in vertically movable relation to said cam plate;
   (g) a cam mechanism associated with the under side of said cam plate and coupled to said guide rod for depressing said brake bar;
   (h) a brake control handle removably attachable to the hand grippable upper frame portion of the hand truck; and
   (i) a cable coupling said brake control handle to said cam mechanism and upwardly actuatable for depressing said brake bar.

2. A brake assembly as in claim 1 wherein said brake control handle is of a generally arcuate configuration with parallel, downwardly depending ends; and which further includes means for supporting said handle ends in vertically slidable relation to the hand grippable upper frame portion of the hand truck.

3. A brake assembly as in claim 1 wherein said brake bar has means for adjusting its horizontal extent so as to conform to the horizontal spacing of the truck wheels.

4. A brake assembly as in claim 1 wherein said brake control handle has horizontally adjustable means to conform to the width of the hand truck frame.

5. A brake assembly as in claim 1 which further includes two vertically extending posts connected between said base and said cam plate, and a step plate on said base secured to said posts.

6. A brake assembly as in claim 1 wherein said cam plate is formed by the upper wall of a square tube.

7. A brake assembly as in claim 1 which further includes a step plate secured upon said base.

8. A brake assembly that is universally mountable to any one of different hand trucks of the type including a vertically extending frame supported on a pair of wheels, said brake assembly comprising:

a brake control handle removably attachable to the upper frame of a hand truck;

a brake bar assembly including a base removably attachable to the axle of the hand truck, and a brake bar having brake pads associated therewith that are adapted to frictionally engage the wheels of the hand truck;

a cam mechanism associated with said brake bar assembly and selectively operable for depressing said brake bar; and a cable coupling said brake control handle to said cam mechanism and responsive to actuation of said handle for depressing said brake bar so as to engage said brake pads with the wheels.

9. A brake assembly as in claim 8 that is mountable to a hand truck of the type having a rigidly stationary axle, wherein said base of said brake bar assembly is rigidly attached to the axle but said brake bar assembly is not attached to the steel frame.

10. A brake assembly as in claim 8 that is mountable to a hand truck of the type having an axle that is slightly rotatably movable, wherein said base of said brake bar assembly is attached both to the axle and to a lower part of the aluminum frame.

11. A brake assembly as in claim 8 wherein said brake control handle is of a generally arcuate configuration with parallel, downwardly depending ends; and which further includes means for supporting said handle ends in vertically slidable relation to the upper end of the hand truck frame.

12. A brake assembly as in claim 8 which further includes a vertical guide rod having its lower end coupled to said brake bar, a cam plate horizontally disposed above said brake bar and in generally parallel relationship thereto, said cam plate having an opening therein, said guide bar extending through said opening; and wherein said cam mechanism is disposed beneath said cam plate, coupled to said guide bar, and coupled to said cable and responsive to upward force on said cable for pushing said guide bar downward so as to engage said brake pads with the truck wheels.

13. A brake assembly as in claim 8 wherein said brake control handle has associated means horizontally adjustable to conform to the width of the upper frame of the hand truck, and said brake bar supports said brake pads from its respective ends and includes means for adjusting its horizontal extent so as to conform to the horizontal spacing of the truck wheels.

\* \* \* \* \*